United States Patent [19]
Conway

[11] Patent Number: 5,152,503
[45] Date of Patent: Oct. 6, 1992

[54] DUAL INLET BALL VALVE

[76] Inventor: Scott T. Conway, 613 W. 59th St., Kansas City, Mo. 64113

[21] Appl. No.: 781,914

[22] Filed: Oct. 24, 1991

[51] Int. Cl.⁵ ............................................. F16K 5/06
[52] U.S. Cl. .................................... 251/315; 137/271
[58] Field of Search ...................... 137/269, 271, 605; 251/315

[56] References Cited

U.S. PATENT DOCUMENTS 3,308,850  3/1967  Gill ................................ 137/271 X
4,311,298  1/1982  Carlson ........................... 251/315 X

FOREIGN PATENT DOCUMENTS 0343909  11/1989  European Pat. Off. ............ 251/315
 463342   7/1928  Fed. Rep. of Germany ...... 251/315

Primary Examiner—John C. Fox
Attorney, Agent, or Firm—Litman, McMahon & Brown

[57] ABSTRACT

A dual inlet ball valve for use in controlling the flow of gas to a log lighting device used in a fireplace comprises a valve body having a horizontal inlet connector, a vertical inlet connector, a outlet connector and a valve stem support structure. A horizontal inlet flow passageway extends through the horizontal inlet connector in horizontal alignment with an outlet flow passageway extending through the outlet connector. A vertical inlet flow passageway extends through the vertical inlet connector in vertical alignment with a stem receiving bore in the valve stem support structure. A ball having a bore hole extending therethrough is rotatably supported between the horizontal inlet flow passageway and the outlet flow passageway on valve seats in a ball support structure. A valve stem engaging the ball is operably engageable to rotate the ball from an open position to a closed position. A connecting flow passageway extending between a flared portion of the valve body wall and the ball support structure allows the vertical inlet flow passageway to flow communicate with the horizontal inlet flow passageway.

11 Claims, 2 Drawing Sheets

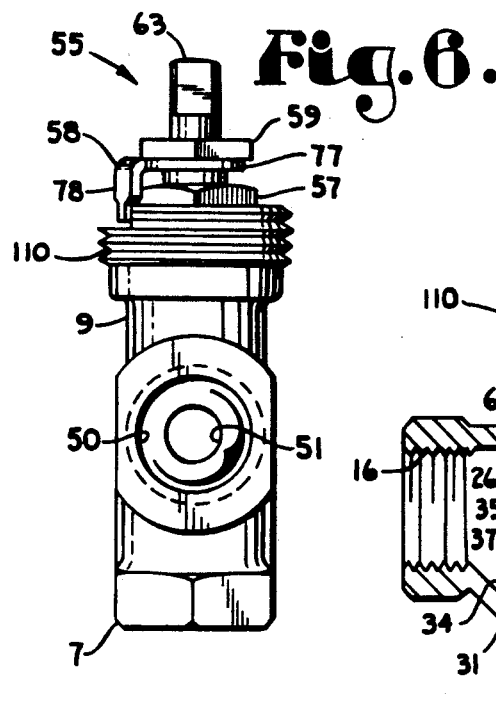
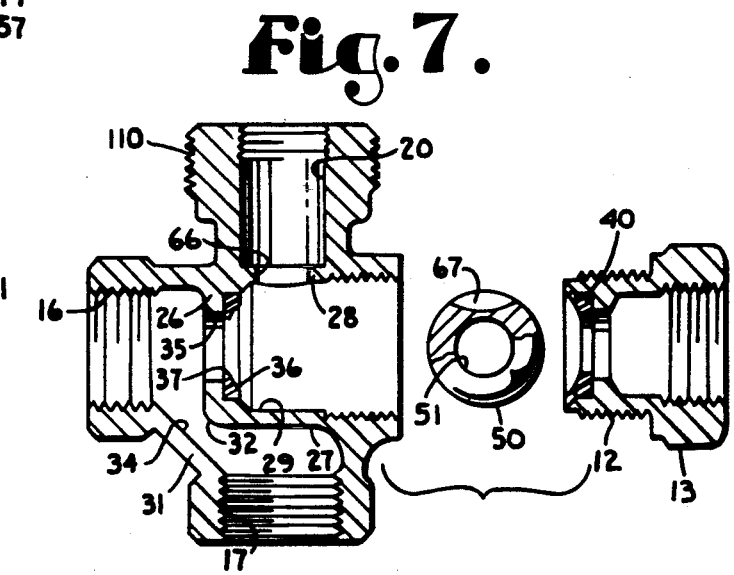
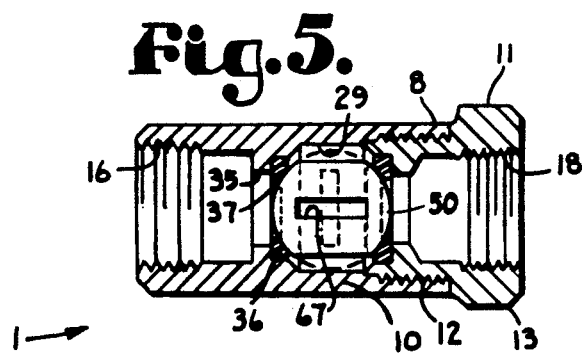
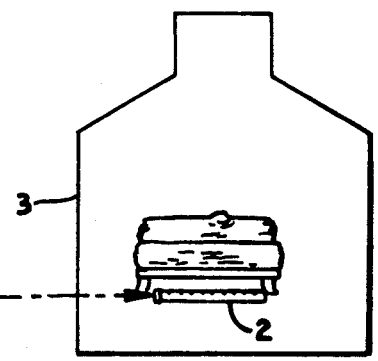
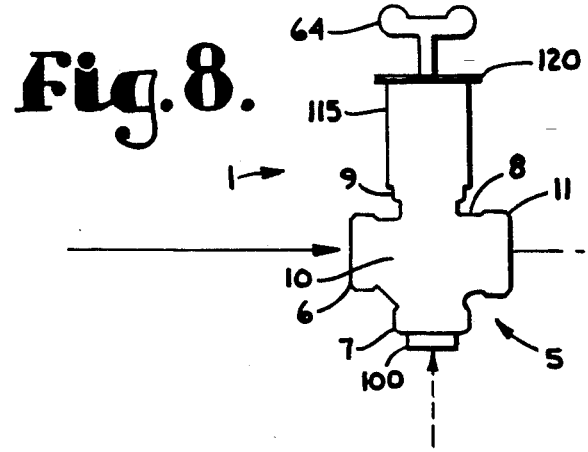

5,152,503

DUAL INLET BALL VALVE

BACKGROUND OF THE INVENTION

The present invention relates to ball valves and, in particular, to a dual inlet ball valve for controlling the flow of gas to a fireplace log lighting device.

Rising stem valves having dual inlets have been developed for gas and water distribution systems. FIG. 3 discloses such a dual inlet rising stem valve. Dual inlet valves have the advantage of allowing an installer of the valve to connect the valve directly to either a horizontally extending conduit or a vertically extending conduit. The installer does not have to worry about modifying the line with a "T" or an elbow to provide a pipe directionally adapted to receive the valve.

A drawback to rising stem valves is that the up and down motion of the valve stem results in wear on the packing for the valve stem and can lead to leaks of water or gas through the valve stem packing. Ball valves reduce the likelihood of leaks by eliminating the need for the up and down motion of the valve stem through valve stem packing.

SUMMARY OF THE INVENTION

The present invention comprises a dual inlet ball valve for use in a gas or water distribution system. The valve comprises a valve body having a horizontal inlet coupling, a vertical inlet coupling, a horizontal outlet coupling and a stem enclosing portion. A male female ball restraining fitting having an outlet flow passageway extending therethrough is secured within the horizontal outlet coupling. A horizontal inlet flow passageway extends horizontally through the horizontal inlet coupling such that the horizontal axis of the outlet flow passageway is linearly aligned with the horizontal axis of the horizontal inlet flow passageway. A vertical inlet flow passageway extends vertically through the vertical inlet coupling.

The horizontal inlet flow passageway and the vertical inlet flow passageway are separated from the outlet flow passageway by a ball and seat support structure having a vertical wall and a horizontal wall. The vertical wall of the ball and seat support structure extends vertically from an upper edge of the inner surface of the valve body towards a lower edge of the inner surface of the valve body so as to extend generally across the horizontal inlet flow passageway and then extends horizontally to a lower edge of the horizontal outlet coupling so as to extend generally across the vertical inlet flow passageway. The vertical wall of the ball and seat support structure includes a through bore so as to allow the horizontal inlet flow passageway to flow communicate with the horizontal outlet flow passageway.

A connecting flow passageway extends in flow communication from the vertical inlet flow passageway to the horizontal inlet flow passageway such that the vertical inlet flow passageway flow communicates with the horizontal inlet flow passageway and the outlet flow passageway. The connecting flow passageway extends between a corner of the ball and seat support structure and a lower angled wall of the valve body extending between the horizontal inlet coupling and the vertical inlet coupling.

A ball is supported between the horizontal inlet flow passageway and the outlet flow passageway by a first and second annular valve seat. The first annular valve seat is secured to the vertical wall of the ball and seat support structure and the second annular valve seat is secured to the male end of the male-female ball restraining fitting such that an aperture in the first annular valve seat flow communicates with the horizontal inlet flow passageway and an aperture in the second annular valve seat flow communicates with the outlet flow passageway.

The ball includes a horizontal bore hole extending centrally therethrough and a lug receiving slot in an upper surface of the ball. A valve stem secured within the stem enclosing portion of the valve body includes a lug portion on a lower end thereof adapted to be received within the lug receiving slot of the ball. The valve stem can be engaged and rotated so as to rotate the ball such that the horizontal bore hole in the ball can be rotated into and out of alignment and flow communication with the horizontal inlet flow passageway and the outlet flow passageway.

The dual inlet ball valve is adapted to be selectively securable to a horizontally extending gas feed conduit or a vertically extending gas feed conduit such that the horizontal inlet coupling is securable to a horizontally extending feed conduit and the vertical inlet coupling is securable to a vertically extending feed conduit. A plug is provided to plug or block off the flow passageway of the coupling that is not secured to a feed conduit.

OBJECTS AND ADVANTAGES OF THE INVENTION

Therefore the objects of the present invention are: to provide a ball valve for gas and water distribution systems having two inlets and one outlet; to provide such a valve that is selectively securable to a horizontally extending feed conduit or a vertically extending feed conduit; to provide such a valve having a horizontal inlet flow passageway and a vertical flow passageway both in flow communication with an outlet flow passageway; to provide such a valve wherein the horizontal inlet flow passageway or the vertical inlet flow passageway may be selectively plugged; to provide such a valve wherein both the horizontal inlet flow passageway and the vertical inlet flow passageway provide adequate flow; to provide such a valve that is relatively free of leaks; to provide such a valve that is relatively strong and capable of withstanding normal stresses; to provide such a valve that resists wear; to provide such a valve that is easy to use and install; to provide such a valve that is relatively inexpensive to manufacture and particularly well adapted for its intended uses thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 5 is a cross-sectional view taken along line 5—5 of FIG. 4.

FIG. 6 is a fragmentary right side elevational view of the valve of the present invention with a male-female ball retaining fitting removed.

FIG. 7 is a fragmentary exploded cross-sectional front view of the valve of the present invention as shown in FIG. 2 with the valve stem assembly removed.

FIG. 8 is schematic diagram showing the valve of the present invention connected to a log lighting device in a fireplace.

DETAILED DESCRIPTION OF THE INVENTION

Figure 1:
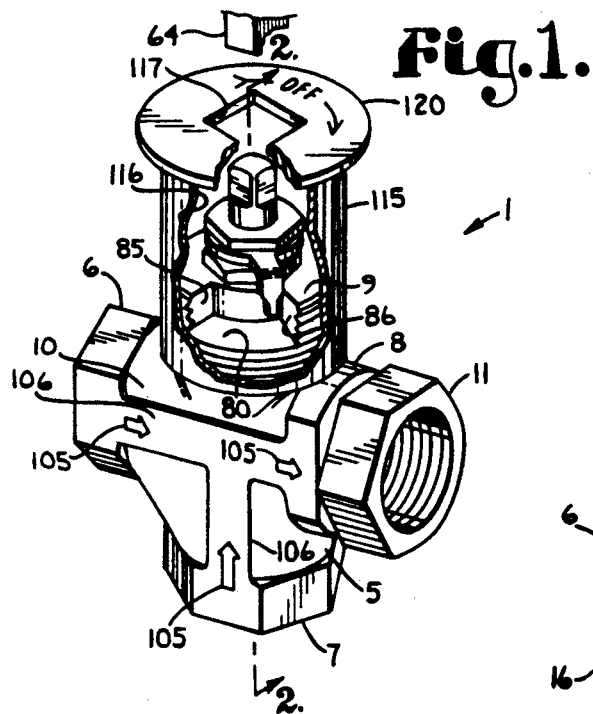
FIG. 1 is a fragmentary perspective view of a dual inlet ball valve of the present invention including a valve body, a valve stem assembly and a tool accessible valve stem housing with portions broken away to show details thereof.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail the reference numeral 1 represents a dual inlet ball valve for use in a gas distribution system and in particular for use in controlling the flow of gas to a log lighting device 2 as shown in FIG. 8 for use in lighting a fire in a fireplace 3. It is foreseeable that the valve 1 may be used in a water distribution system. The valve 1 comprises a valve body 5 having a first threaded female connector 6, a second threaded female connector 7, a third threaded female connector 8 and a valve stem support structure 9, each connected together by a valve body wall 10.

The first and second threaded female connectors 6 and 7 have a hexagonal shaped outer surface and a threaded inner surface. The third threaded female connector 8 also includes a threaded inner surface. A male-female ball restraining fitting 11 is threadingly and removably secured to the third threaded female connector 8. The male-female ball restraining fitting 11 includes a male end 12 and a female end 13 wherein the female end 13 has a hexagonal shaped outer surface and a threaded inner surface and the male end 12 has a threaded outer surface.

A horizontal inlet flow passageway 16 extends horizontally through the first threaded female connector 6. A vertical inlet flow passageway 17 extends vertically through the second threaded female connector 7. An outlet flow passageway 18 extends horizontally through the male-female ball restraining fitting 11. A stem receiving bore 20 extends into the stem support structure 9. The horizontal axis of the outlet flow passageway 18 is linearly aligned with the horizontal axis of the horizontal inlet flow passageway 16. The vertical axis of the vertical inlet flow passageway 17 is linearly aligned with the vertical axis of the stem receiving bore 20. The linearly aligned vertical axes of the vertical inlet flow passageway 17 and the stem receiving bore 20 are perpendicularly aligned with the linearly aligned horizontal axes of the horizontal inlet flow passageway 16 and the outlet flow passageway 18.

The valve body further comprises a ball and seat support structure or ball housing 25 having a vertical wall 26 and a horizontal wall 27. The ball housing 25 is generally positioned at the confluence of the horizontal inlet flow passageway 16 and the vertical inlet flow passageway 17. The ball housing 25, the male end 12 of the male-female ball restraining fitting and a dividing wall 28 in the stem support structure 9 generally define a ball receiving chamber 29. The dividing wall 28 separates the stem receiving bore 20 from the ball receiving chamber 29.

The vertical wall 26 of the ball housing 25 extends from an inner surface of an upper portion 30 of the valve body wall 10 extending between the first threaded female connector 6 and the stem support structure 9 downwards towards a flared portion 31 of the valve body wall 10 extending between the first threaded female connector 6 and the second threaded female connector 7. The vertical wall 26 forms a rounded corner 32 with the horizontal wall 27 which extends horizontally from the corner 32 to an inner surface of a lower portion 33 of the valve body wall 10 extending between the third threaded female connector 8 and the second threaded female connector 7. The corner 32 of the ball housing 25 is spaced away from an inner surface of the flared portion 31 of the valve body wall 10.

Figure 2:
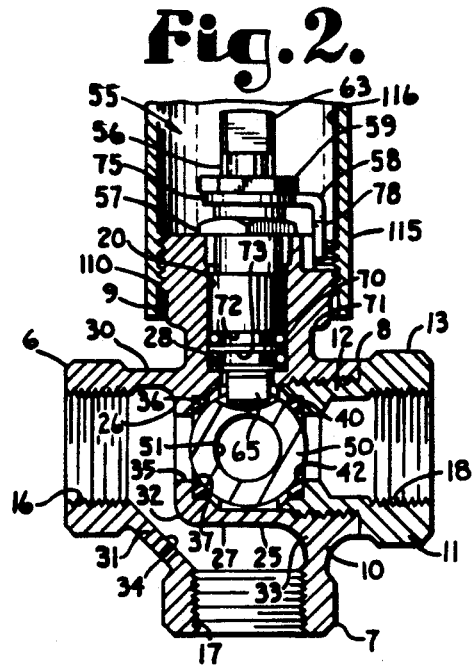
FIG. 2 is a fragmentary cross-sectional view generally taken along line 2—2 of FIG. 1.
Figure 3:
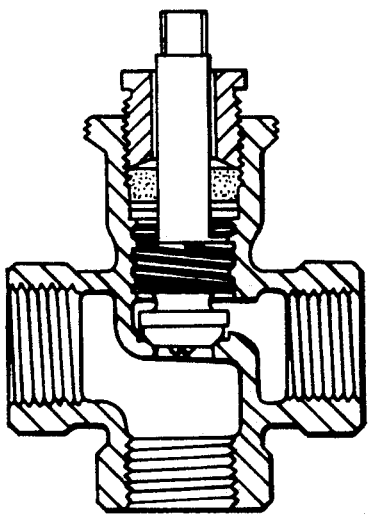
FIG. 3 is a cross-sectional front view of a dual inlet rising stem valve of the prior art showing the valve in a closed position.

The flared portion 31 of the valve body wall 10 is generally saddle shaped. As shown in FIG. 2 and in FIG. 7 the flared portion 31 of the valve body wall 10 extends from the second threaded female coupling 6 to the first threaded female coupling 7 approximately at a 45 degree angle with respect to the vertical axis of the vertical inlet flow passageway 17.

A connecting flow passageway 34 extends between the ball housing 25 generally along the corner 32 thereof and the flared portion 31 of the valve body wall 10. The connecting flow passageway 34 generally extends from the vertical inlet flow passageway 17 to the horizontal inlet flow passageway 16 at a 45 degree angle with respect to the vertical axis of the vertical inlet flow passageway 17.

The vertical wall 26 generally extends completely across the horizontal inlet flow passageway 16 to the connecting flow passageway 34 and the horizontal wall 27 generally extends completely across the vertical inlet flow passageway 17 to the connecting flow passageway 34. The vertical wall 26 includes a through bore 35 in flow communication with the horizontal inlet flow passageway 16. A first annular valve seat 36 is secured to an inner surface of the vertical wall 26 such that an aperture 37 in the first annular valve seat 36 is aligned with the through bore 35 in the vertical wall 26. A second annular valve seat 40 is secured to the male end 12 of the male-female ball restraining fitting 11. An aperture 42 in the second annular valve seat 40 is aligned with the outlet flow passageway 18. The first and second annular valve seats 36 and 40 are preferably made of a low friction material such as polytetrafluoroethylene.

A ball 50 having a bore hole 51 extending therethrough is rotatably supported in the ball housing 25 on the first and second annular valve seats 36 and 40 such that the bore hole 51 extends horizontally through the ball 50. The low friction material of the annular valve seats 36 and 40 allows for slidable and sealing contact of the valve seats 36 and 40 with the outer periphery of the ball 50. The ball 50 is rotatable about a vertical axis such that the bore hole 51 is rotatable into and out of flow communication with the horizontal inlet flow passageway 16 and the outlet flow passageway 18. To ensure adequate flow through the valve 1, the cross-sectional area of the connecting flow passageway 34 at its narrowest point is preferably equal to or greater than the cross-sectional area of the bore hole 51 in the ball 50.

Figure 4:
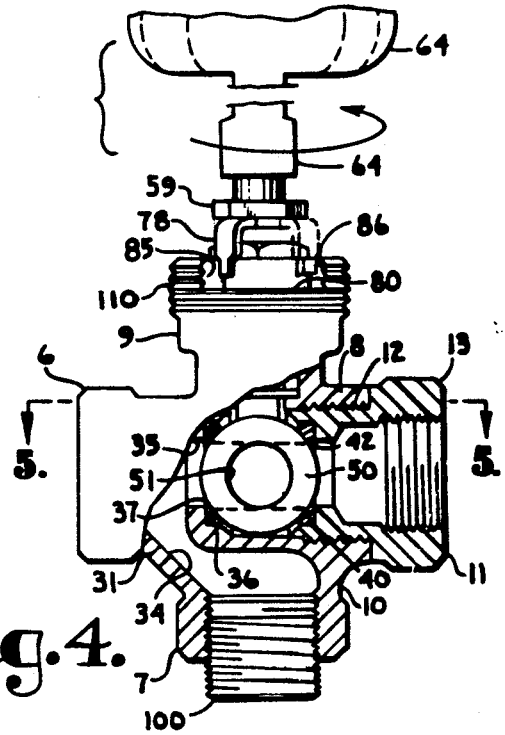
FIG. 4 is a fragmentary front elevational view of the valve of the present invention with portions broken away to show detail thereof.

A valve stem assembly 55 comprising a valve stem 56, a stem retaining nut 57, a stem stop 58 and a stem stop retaining nut 59, is removably secured within the stem receiving bore 20 in the stem support structure 9. An upper end of the valve stem 56 forms a bolt head 63 engageable by a key 64 for rotating the valve stem 56 as shown in FIG. 4. A lug 65 extends from a lower end of the valve stem 56 through a lug receiving aperture 66 in the dividing wall 28 and is adapted to engage a slot 67 in the top of the ball 50 such that rotation of the valve stem effectuates rotation of the ball 50. A pair of rubber O-rings 70 and 71 are secured within grooves 72 and 73 on a lower portion of the valve stem 56 and are adapted to engage the inner surface of the stem supporting structure 9 defining the stem receiving bore 20 to form a seal therebetween so as to prevent the leakage of gas or liquids around the valve stem 56. The stem retaining nut 57 threadingly cooperates with the stem support structure 9 to rotatably secure the valve stem 56 therein.

The stem stop 58 generally comprises an annular disc 75 secured about the valve stem 56 above an upper surface of the stem support structure 9 and a projection or finger 76 bent downward so as to extend below the upper surface of the stem support structure 9 and into a cutout portion 80 in the stem support structure 9. The cutout portion 80 extends from a first abutting wall 85 to a second abutting wall 86 in the upper portion of the stem support structure 9 such that the finger 76 of the stem stop 58 may be rotated therebetween.

The first and second abutting walls 85 and 86 are spaced apart such that the valve stem 56 may be rotated eighty to one hundred degrees and preferably ninety degrees. When the finger 76 is advanced into abutting relationship with the first abutting wall 85 the horizontal axis of the bore hole 51 of the ball 50 is advanced into linear alignment with the horizontal axis of the horizontal inlet flow passageway 16 and the horizontal axis of the outlet flow passageway 18 so as to advance the ball into an open or on position. When the finger 76 is advanced into abutting relationship with the second abutting wall 86, the horizontal axis of the bore hole 51 of the ball 50 is advanced into generally perpendicular alignment with the horizontal axis of the horizontal inlet flow passageway 16 and the horizontal axis of the outlet flow passageway 18 so as to advance the ball into a closed or offposition.

The dual inlet ball valve 1 is adapted to be selectively securable to a horizontally extending gas feed conduit(not shown) or a vertically extending gas feed conduit(not shown) such that the first threaded female connector 6 is securable to a horizontally extending feed conduit and the second threaded female connector 7 is securable to a vertically extending feed conduit. A plug 100 is provided to plug or block off the horizontal inlet flow passageway 16 or the vertical inlet flow passageway 7 of the first or second threaded female connector 6 or 7 respectively that is not secured to a feed conduit. For example, the first threaded female connector 6 may be secured to a horizontally extending gas feed conduit and the plug 100 may be secured within the second threaded female connector 7 so as to plug or block off the vertical inlet flow passageway 17. Similarly, the second threaded female connector 7 may be secured to a vertically extending gas feed conduit and the plug 100 may be secured within the first threaded female connector 6 so as to plug or block off the horizontal inlet flow passageway 16.

As shown in FIG. 1, flow direction indicating arrows 105 are formed in raised portions 106 on the outer surface of the valve body 10 to indicate the proper orientation of the valve 1 when securing the valve 1 to a feed conduit to ensure proper directional flow through the valve 1. The arrows 105 are preferably formed on both sides of the valve 1.

The stem support structure 9 includes a threaded outer surface 110 at the upper portion thereof such that the valve 1 is threadingly securable to a tool accessible valve stem housing or escutcheon 115 as shown in FIG. 1. The tool accessible valve stem housing 115 defines a non-manually accessible valve stem well 116 into which the key 64 may be inserted to engage the valve stem 56. A tool access opening 117 in a top plate 120 of the housing 115 provides access for the key 64 to the valve stem 56. Typically, the tool accessible valve stem housing 115 is supported by the top plate 120 in a hole in a floor such that the valve 1 is supported by the housing 115 just below the floor so that the valve stem 56 does not extend above the floor. The hole in which the housing 115 is placed is generally positioned in close proximity to a fireplace in association with which the valve 1 is to be used. The key 64, inserted in the non-manually accessible valve stem well 116, is manipulated to engage and rotate the valve stem 56 to advance the ball 50 between open and closed positions. When the ball is rotated to an open position, gas is delivered to the log lighting device 2 located in the fireplace 3 and the gas is lit.

It is to be understood that while certain forms of the present invention have been illustrated and described herein, it is not to be limited to the specific forms or arrangement of parts described and shown.

What is claimed and desired to be secured by Letters Patent is as follows:

1. A ball valve comprising:
  (a) a ball having a bore hole extending therethrough;
  (b) a valve body comprising:
    i. a first inlet connector having a first inlet flow passageway extending therethrough;
    ii. a second inlet connector having a second inlet flow passageway extending therethrough;
    iii. an outlet connector having an outlet flow passageway extending therethrough;
    iv. a ball support structure supporting said ball in said valve body between said first and second inlet flow passageways and said outlet flow passageway;
    v. a valve body wall extending between said first inlet connector, said second inlet connector and said outlet connector; said valve body wall including a flared portion extending between said first inlet connector and said second inlet connector and defining a connecting flow passageway extending between said flared portion and said ball support structure so as to flow connect said first inlet flow passageway and said second inlet flow passageway;
  (c) a valve stem engaging said ball and operable to selectively rotate said ball from an open position to a closed position such that when said ball is rotated to said open position said bore hole in said ball flow connects said first and second inlet flow passageways with said outlet flow passageway and when said ball is rotated to said closed position said first and second inlet flow passageways are flow disconnected from said outlet flow passageway; and (d) a plug for selectively blocking said first inlet flow passageway or said second inlet flow passageway.

2. The ball valve as disclosed in claim 1 wherein:

(a) a horizontal axis of said first inlet flow passageway is linearly aligned with a horizontal axis of said outlet flow passageway; a vertical axis of said second inlet flow passageway extends perpendicularly to said horizontal axis of said first inlet flow passageway.

3. The ball valve as disclosed in claim 1 wherein:

(a) said vertical axis of said second inlet flow passageway is linearly aligned with an axis of rotation of said valve stem.

4. The valve stem as disclosed in claim 1 further comprising:

(a) means for preventing rotation of said ball past said open position as said ball is rotated into said open position from said closed position; and (b) means for preventing rotation of said ball past said closed position as said ball is rotated into said closed position from said open position.

5. A ball valve comprising:

(a) a ball having a bore hole extending therethrough;

(b) a valve body comprising;

i. a first threaded female connector having a first inlet flow passageway extending therethrough;

ii. a second threaded female connector having a second inlet flow passageway extending therethrough;

iii. a third threaded female connector having an outlet flow passageway extending therethrough;

iv. a valve stem support structure;

v. a ball support structure for supporting said ball in said valve body between said first and second inlet flow passageways and said outlet flow passageway;

vi. a valve body wall extending between said first threaded female connector, said second threaded female connector, said third threaded female connector and said valve stem support structure; said valve body wall including a flared portion extending between said first threaded female connector and said second threaded female connector and defining a connecting flow passageway extending between said flared portion and said ball support structure so as to flow connect said first inlet flow passageway and said second inlet flow passageway; a narrowest portion of said connecting flow passageway having a cross-sectional area equal to or greater than a cross-sectional area of said bore hole in said ball;

(c) a valve stem securable within a valve stem receiving bore in said valve stem support structure and operable to selectively rotate said ball from an open position to a closed position such that when said ball is rotated to said open position said bore hole in said ball flow connects said first inlet flow passageway with said outlet flow passageway and when said ball is rotated to said closed position said first inlet flow passageway is flow disconnected from said outlet flow passageway; and (d) a plug for selectively blocking said first inlet flow passageway or said second inlet flow passageway.

6. The ball valve as disclosed in claim 5 wherein:

(a) a horizontal axis of said first inlet flow passageway is linearly aligned with a horizontal axis of said outlet flow passageway; a vertical axis of said second inlet flow passageway is linearly aligned with an axis of rotation of said valve stem.

7. The ball valve as disclosed in claim 5 wherein:

(a) said horizontal axis of said first inlet flow passageway is perpendicularly aligned with said vertical axis of said second inlet flow passageway.

8. The ball valve as disclosed in claim 5 wherein:

(a) said flared portion of said valve body wall extends from said first threaded female connector to said second threaded female connector at a forty five degree angle with respect to the vertical axis of said second inlet flow passageway.

9. The ball valve as disclosed in claim 5 further comprising:

(a) a tool accessible valve stem housing removably securable to said valve stem support structure so as to prevent manual access to said valve stem; said housing including a tool access opening adapted to provide access for a key to operably engage and rotate the valve stem so as to rotate the ball.

10. The ball valve as disclosed in claim 5 further comprising:

(a) a male-female ball restraining member secured to said third threaded female connector such that said outlet flow passageway extends through said male-female ball restraining member;

(b) a first annular valve seat secured to said ball support structure;

(c) a second annular valve seat secured to a male end of said male-female ball restraining member; said ball rotatably supported by said first and second annular valve seats.

11. The valve stem as disclosed in claim 5 further comprising:

(a) means for preventing rotation of said ball past said open position as said ball is rotated into said open position from said closed position; and (b) means for preventing rotation of said ball past said closed position as said ball is rotated into said closed position from said open position.

* * * * *